US007707625B2

(12) United States Patent
Klinefelter

(10) Patent No.: US 7,707,625 B2

(45) Date of Patent: Apr. 27, 2010

(54) CREDENTIAL PROCESSING DEVICE EVENT MANAGEMENT

(75) Inventor: Gary M. Klinefelter, Eden Prairie, MN (US)

(73) Assignee: HID Global Corporation, Irvine, CA (US)

( * ) Notice: Subject to any disclaimer, the term of this patent is extended or adjusted under 35 U.S.C. 154(b) by 1064 days.

(21) Appl. No.: 11/391,994

(22) Filed: Mar. 29, 2006

(65) Prior Publication Data

US 2006/0225131 A1 Oct. 5, 2006

Related U.S. Application Data

(60) Provisional application No. 60/666,523, filed on Mar. 30, 2005.

(51) Int. Cl.
*H04L 9/32* (2006.01)

(52) U.S. Cl. .................... 726/6; 726/19; 726/5; 726/18

(58) Field of Classification Search ................. 713/192, 713/168, 182; 726/31, 24, 30; 709/12, 14; 705/59

See application file for complete search history.

(56) References Cited

U.S. PATENT DOCUMENTS 5,913,090 A 6/1999 Sawada et al. ................. 399/8
6,348,971 B2 2/2002 Owa et al. ................. 358/1.15
6,430,616 B1 8/2002 Brinnand et al. ............ 709/224
6,666,594 B2 12/2003 Parry ........................... 400/74
6,735,484 B1 5/2004 Lenz ........................... 700/51
6,873,802 B2 3/2005 Koga et al. ..................... 399/27
2005/0001711 A1* 1/2005 Doughty et al. ............ 340/5.74
2005/0123134 A1* 6/2005 Alasia ......................... 380/54
2005/0198515 A1* 9/2005 Lapstun et al. .............. 713/182
2006/0206732 A1* 9/2006 Kasahara .................... 713/300
2009/0037739 A1* 2/2009 Silverbrook et al. ........ 713/176

* cited by examiner

*Primary Examiner*—Brandon S Hoffman
*Assistant Examiner*—Nega Woldemariam
(74) *Attorney, Agent, or Firm*—Westman, Champlin & Kelly, P.A.

(57) ABSTRACT

In a method of monitoring a group of credential processing devices, credential substrates are processed using the credential processing devices of the group. Next, event outputs are received. Each event output relates to an occurrence of a process event during the processing of the substrate by one of the devices. Finally, a relative condition score is calculated for a subject device of the group based on the event outputs corresponding to the subject device and the event outputs corresponding to the other devices in the group. The relative condition score of the subject device is a measure of a condition of the subject device relative to the conditions of the other devices in the group. Also disclosed is a system configured to perform the above-described method.

19 Claims, 3 Drawing Sheets

CREDENTIAL PROCESSING DEVICE EVENT MANAGEMENT

CROSS-REFERENCE TO RELATED APPLICATION

The present application is based on and claims the benefit of U.S. provisional patent application Ser. No. 60/666,523, filed Mar. 30, 2005, the content of which is hereby incorporated by reference in its entirety.

FIELD OF THE INVENTION

The present invention generally relates to credential processing device event management and, more specifically, to systems and methods for producing a relative condition score for a subject credential processing device of a group of credential processing devices that provides a measure of a condition of the subject device relative to the conditions of the other devices in the group.

BACKGROUND OF THE INVENTION

Credentials include identification cards, driver's licenses, passports, and other documents. Such credentials are formed from credential substrates including paper substrates, plastic substrates, cards and other materials. Such credentials generally include printed information, such as a photo, account numbers, identification numbers, and other personal information. A secure overlaminate may also be laminated to the surfaces of the credential substrate to protect the surfaces from damage and, in some instances, provide a security feature (e.g., hologram). Additionally, credentials can include data that is encoded in a smartcard chip, a magnetic stripe, or a barcode, for example.

Credential production systems utilize one or more credential processing devices, each of which processes a credential substrate to perform at least one step in forming the final credential product. Such credential processing devices include, for example, printing devices for printing images to the credential substrate, laminating devices for laminating an overlaminate to the credential substrate, flipping devices for rotating the credential substrate, and encoding devices for encoding data to the substrate.

Credential processing devices are complex electromechanical devices that use multiple continuous and discrete processes for completing the desired processing of the credential substrate. For example, identification card printers and laminators utilize multiple processes for the feeding, transport, encoding, thermal printing, lamination and stacking of card substrates.

The electromechanical components that perform the processes in the credential processing devices are prone to failure. The failure of a single component can render the credential processing device inoperable.

Diagnostics can be performed on the components and processes of the credential processing device in an effort to detect problems including potentially failing components of the device before the device is rendered inoperable. In general, process events are detected that are indicative of a problem with the credential processing device. Notice of a need to service the device can be provided to an operator of the device in response to the detection of a process event.

While the detection of process events may provide desired notice of a need to service of the device, it is not generally indicative of whether the credential processing device is operating normally since the components of the device will degrade with use. It is only through an analysis or comparison of the performance of one credential processing device to another that an assessment of whether the credential processing device is operating within a range of normalcy can be made.

There exists a continuing need for improved credential processing device monitoring including methods and systems that are capable of evaluating individual credential processing device performance relative to other credential processing devices.

SUMMARY OF THE INVENTION

Methods of monitoring a group of credential processing devices and systems for performing the method are disclosed. In the method, credential substrates are processed using the credential processing devices of the group. Next, event outputs are received. Each event output relates to an occurrence of a process event during the processing of the substrate by one of the devices. Finally, a relative condition score is calculated for a subject device of the group based on the event outputs corresponding to the subject device and the event outputs corresponding to the other devices in the group. The relative condition score of the subject device is a measure of a condition of the subject device relative to the conditions of the other devices in the group.

Also disclosed is a credential production system for performing the above-identified method. The system includes a group of credential processing devices, one or more event analyzers and an event manager. Each of the credential processing devices is configured to process a credential substrate. The one or more event analyzers are configured to produce event outputs that relate to an occurrence of an event during the processing of the substrate by the devices. The event manager is configured to calculate a relative condition score for a subject device of the group based on the event outputs corresponding to the subject device and the event outputs corresponding to the other devices in the group. The relative condition score of the subject device is a measure of a condition of the subject device relative to the conditions of the other devices in the group.

DETAILED DESCRIPTION OF ILLUSTRATIVE EMBODIMENTS

Figure 1:
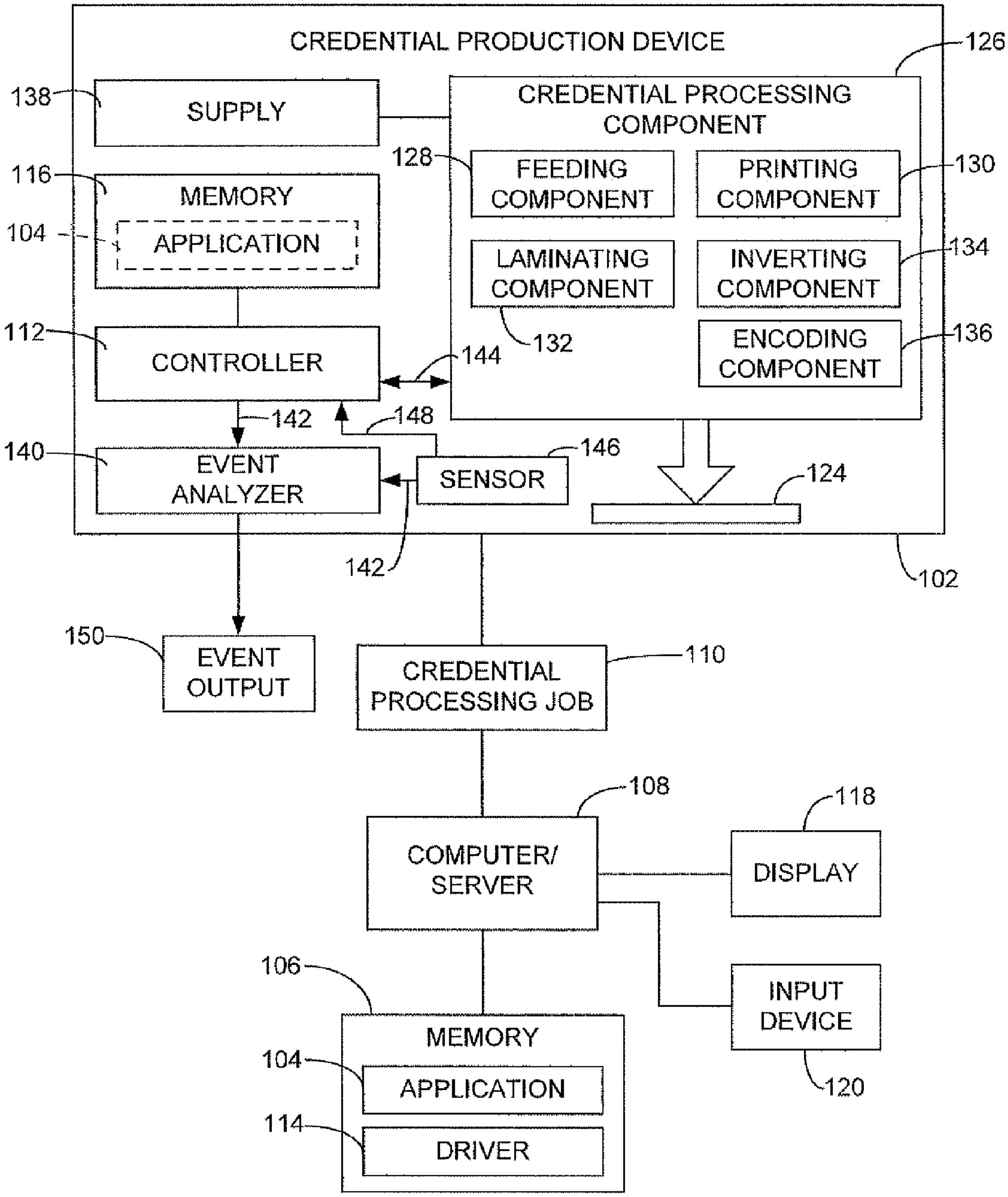
FIG. 1 is simplified block diagram of a credential processing device in accordance with embodiments of the invention.

FIG. 1 is a simplified block diagram of an exemplary credential processing device 102 in accordance with embodiments of the invention that is used to perform at least one step in the formation of a credential (e.g. an identification card, a passport page, an employee badge, and other credentials). A credential processing application 104 is stored in a computer-readable memory 106 that is accessible for execution by a computer or a host server 108 that is configured to communicate with the credential processing device 102 in accordance with conventional methods including a physical communication link (i.e., cable connection such as, for example, Universal Serial Bus), a wireless communication link, or a network communication link.

The application 104 is configured to generate a credential processing job 110 that includes processing instructions for the credential processing device 102. The credential processing job 110 is presented to a controller 112 of the credential processing device 102 through a suitable driver application 114 stored in the memory 106 that is accessible by the computer or server 108 (hereinafter "computer"), for example. Alternatively, the application 104 can be stored in a computer-readable memory 116 of the credential processing device 102. A user can view an application interface provided on a display 118 and operate the application 104 through a suitable input device 120, such as a keyboard, mouse, etc., to form the credential processing job 110.

The credential processing device 102 is configured to process a credential substrate 124 (e.g., card substrates, paper substrates, plastic substrates, substrates used to form passports, and other credential-related materials) in response to the credential processing job 110. Exemplary processes performed by the credential substrate processing device 102 include feeding the substrate 124 through the device 102, printing an image to the credential substrate 124, laminating an overlaminate to the credential substrate 124, inverting or rotating the substrate to facilitate dual-sided processing or rerouting of the substrate, and/or encoding data to the substrate 124.

The device 102 includes one or more conventional credential processing components 126 for performing the desired processing of the substrate 124. Exemplary components 126 include feeding components 128 (e.g., motorized rollers) for feeding the substrate through the device 102, printing components 130 (e.g., inkjet printhead, thermal printhead, laser printhead, thermal transfer roller, ribbon feeding and positioning components, etc.), credential substrate laminating components 132 (e.g., heated roller, overlaminate feeding and positioning components), substrate inverting or rotating components 134, credential substrate encoding components 136 (e.g., barcode writer, magnetic stripe writer, memory chip writer, etc.), and other components used to perform a process in the device 102.

The credential processing component 126 can operate with one or more consumable supplies 138 to perform the desired processing of the substrate. Exemplary supplies 138 include a supply of credential substrates 124 (e.g., a cartridge or hopper containing the substrates), a print consumable (e.g., ink or dye) for application to the substrate 124 by a printing device 130 to print images to the substrate 124, an overlaminate supply for application to the substrate 124 by a laminating device 132, and other types of consumable supplies.

The controller 112 of the credential processing device 102 is generally configured to process the credential substrate 124 using the credential processing component 126 in response to the credential processing job 110 produced by a user of the credential processing application 104. The credential processing job 110 provides instructions for the credential processing device 102 to perform the desired processing of the credential substrate 124. For example, a credential processing job 110 for processing a card substrate 124 to produce an identification card can include instructions for printing a photograph and personal information in accordance with a predefined layout. Additional exemplary instructions include laminating instructions for a laminating device to apply an overlaminate to a surface of the substrate 124, flipping instructions for a flipping or rotating device to flip the substrate 124, encoding instructions for a data encoding device to encode data to the substrate 124, and other processing instructions for the credential processing device 102.

Since credential processing devices 102 can include multiple complex actuation mechanisms and material transport systems, they are prone to failure. A single failure can render the credential processing device 102 inoperable.

Pending or minor failures in the device 102 can be detected in accordance with known methods. In general, an analysis of the components used by the device 102 or the processes performed by the device 102 is made in order to detect process events, such as a diagnostic event, that may indicate a pending or minor failure in advance of a catastrophic failure. Exemplary methods and systems for detecting such events are disclosed in U.S. Pat. No. 6,735,484, which is assigned to Fargo Electronics, Inc. of Eden Prairie, Minn., and is hereby incorporated by reference in its entirety.

An event analyzer 140 represents the components, program instructions, etc. that perform the analysis and event detection for the device 102. The event analyzer 140 can be a component of the device 102 (FIG. 1). Alternatively, one or more components of the event analyzer can be remotely located from the device 102 and placed in communication with the device 102 through a network or other communication link.

In general, the event analyzer 140 receives one or more process signals 142 that relate to the process or components 126 in the process being performed by the device 102. The process signal 142 can relate to a process variable that is being controlled in the process, such as, for example, a temperature, a position, a motor current, a motor voltage, a rotary position, a ribbon tension, a magnetic field strength, or other characteristic of the process.

The process signal 142 can also relate to a control signal 144 that is used to control the process. Exemplary control signals include a desired process value, such as desired temperature, pressure, force, position, current, voltage, tension, etc., which is adjusted by a controller 112 or used to control the process.

The process signal 142 can also relate to a diagnostic signal that includes information relating to the operation of the components 126 of the device 102 used for process control, but does not include the process variables or control signals. For example, diagnostic signals include heater resistance, motor load voltage or current, print head resistance, device temperature, frequency, on-off position, spectrum or spectral components, electric or magnetic field strength, motion, electric motor back emf, or any other parameter which may be measured in the system.

The process signals 142 can be generated by one or more sensors 146 configured to sense operation of some portion of credential processing device 102. The sensor 146 can also provide feedback 148 to the controller 112 for use in controlling the processing of the substrate 124. The sensor 146 can be any type of sensor. Exemplary sensors 148 include position sensors, pressure sensors, heat sensors, light or optical sensors, tension sensors, quantity sensors such as sensors used to measure the amount of printing material or credential substrates which are available, sensors used to monitor a lamination process, sensors to monitor power, current, voltage, or other inputs provided to the various components within credential processing device 102.

The event analyzer 140 performs an analysis of the process signals to determine whether an event output 150, indicating a problem with the device 102, is warranted. One conventional method involves the calculation of statistical parameters for each of the process signals based on a rule stored in either local memory, such as memory 116, or remote memory, such as memory 106. Exemplary statistical parameters include standard deviation, mean, sample variance, root-mean-square (rms), range (delta R), and rate of change (ROC) of the process signal. Other statistical parameters relating to the process signals can also be used. The calculated statistical parameter for a process signal is compared to preset statistical parameter values to determine whether an event has occurred that is indicative of a problem with the corresponding component 126 or process of the device 102. Sensitivity values may be set to accommodate for a range of acceptable performance for the device 102 or component thereof. Exemplary, process events that are detectable using the above-described methodology include for example, normal and bias states, drift events, noisy signal conditions, spike events and stuck events, all of which can be indicative of a problem with a component or process of the device 102. Other methods for determining whether an event output 150 is warranted for the device 102 can also be used.

Each of the event outputs 150 are indicative of a process event or problem with one or more components 126 of the device 102, or the process being performed by the device 102. Exemplary problems include: substrate feeding problems (e.g., jammed substrate, detection of a substrate when none should be present, non-detection of a substrate when a substrate is expected, motor error, etc.); substrate printing problems (e.g., absent substrate, absent print consumable, improper printhead setting, detection of improper printhead parameter or variable, printhead position error, temperature related error, etc.); substrate laminating problems (e.g., laminating roller error, absent substrate, absent overlaminate material, temperature related error, etc.); substrate inverting problems (e.g., stuck substrate, absent substrate, motor error, etc.); substrate encoding problems (e.g., data write errors, data read errors, absent substrate, stuck substrate, etc.); and other problems with components and processes performed by the devices.

In accordance with one conventional method, the event analyzer 140 is configured to determine which component or components 126 in the device 102 is faulty. This determination can be made through the analysis of process variables, control signals and other process signals to determine the cause of the process event. For example, if a drift event is detected, the event analyzer 146 operates to determine the cause of the drift. For example, the drift may be due to a control setpoint such as print head temperature which was changed, in which case the event analyzer 140 determines that the controller 112 is operating properly and an event output 150 indicative of a problem is not generated. However, if the setpoint was not changed, the event analyzer 140 further analyzes the process signals to determine the integrity of the component reporting a process event, such as the print head, laminator, card feed, roller, etc., by running appropriate diagnostics.

If the diagnostic indicates that the component 126 is operating properly, the event analyzer 140 may then perform more general device diagnostics to determine if the device 102 and associated sensors 146 are operating properly. These diagnostics may observe information from the specific element being reviewed and may also observe information being received from other sources such as other components used to control the processing of the substrate in the device 102. Conventional computational techniques can be used to perform this component identification function such as a series of rules, fuzzy logic or neural networks. In one embodiment, the event analyzer 140 is implemented in a microprocessor and memory and may be located in the device 102 or at some remote location.

One aspect of the present invention is directed to the monitoring of a group of credential processing devices 102 to establish relative condition scores for at least one of the credential processing devices 102 that is a measure of a condition of the device 102 relative to the conditions of the other devices 102 in the group. The relative condition score gives an administrator of the system a way to evaluate whether there is a credential processing device 102 in the group that is operating abnormally and may require servicing. Likewise, the relative condition score provides the administrator with a way to gauge which devices 102 may be more reliable than the other devices 102.

Figure 2:
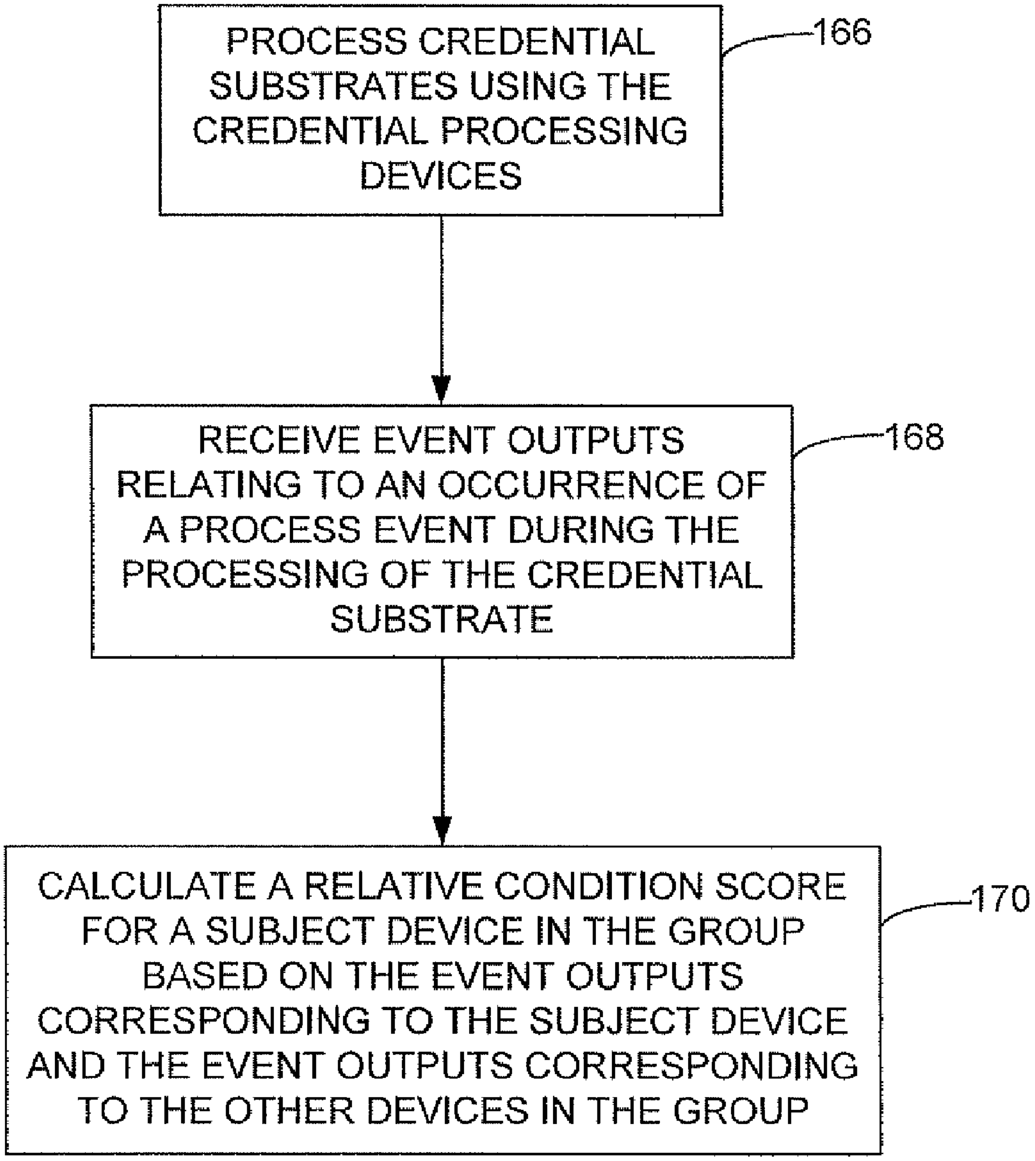
FIG. 2 is a flowchart illustrating a method of monitoring a group of credential processing devices in accordance with embodiments of the invention.
Figure 3:
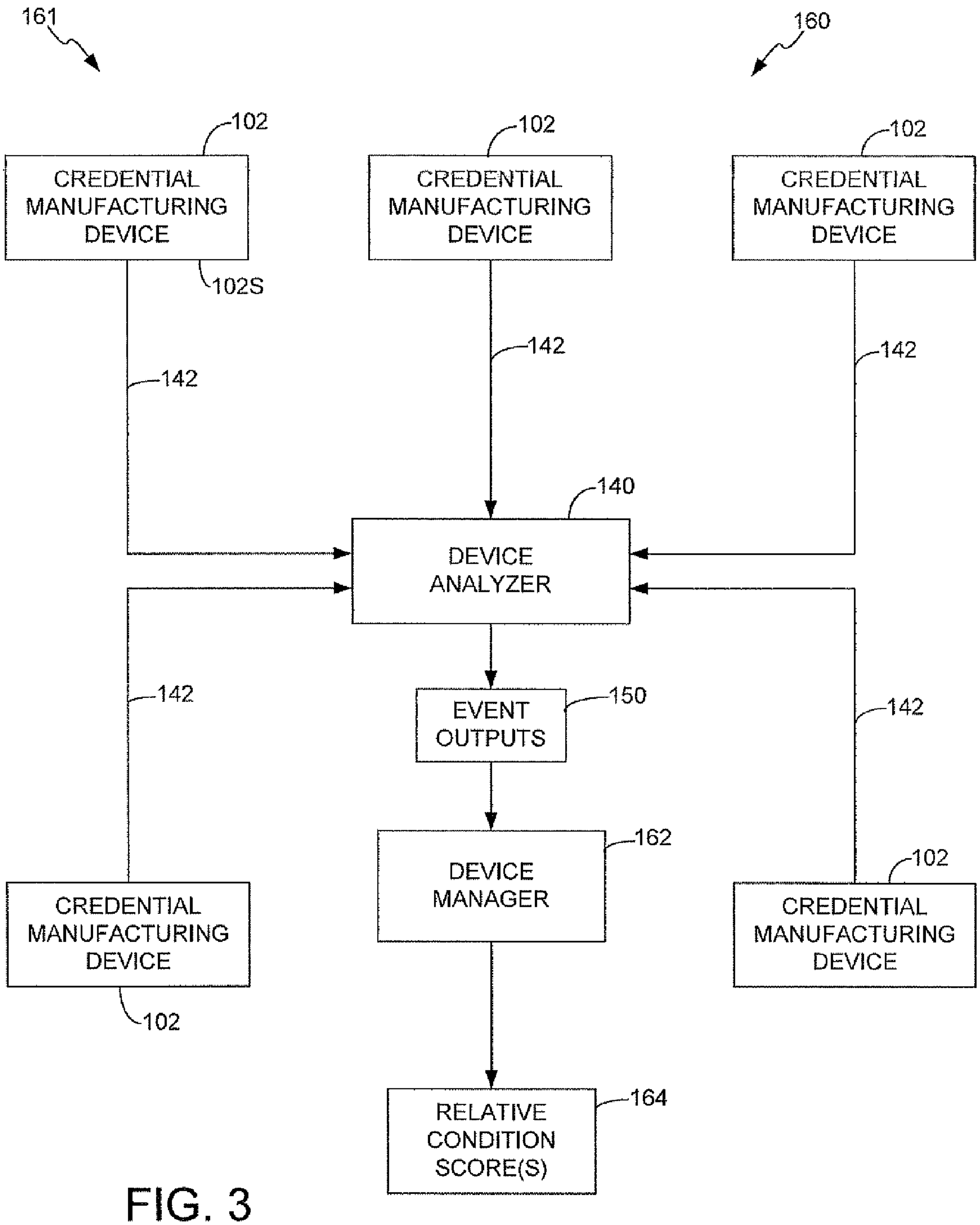
FIG. 3 is a simplified block diagram of a credential production system in accordance with embodiments of the invention.

With reference to FIGS. 2 and 3, a discussion of embodiments of a method and system for monitoring a group of credential processing devices will be discussed. FIG. 2 is a flowchart illustrating the method in accordance with embodiments of the invention. FIG. 3 is a simplified block diagram of embodiments of a credential production system 160 that is configured to implement the method.

The system 160 generally comprises a group 161 of credential processing devices 102. The credential processing devices 102 generally operate as discussed above. Accordingly, each of the credential processing devices 102 is configured to process a credential substrate 124 in accordance with a credential processing job 110. The credential processing job 110 can be generated by a credential processing application 104 running on a local or remote computer 108, as illustrated in FIG. 1. Additionally, one or more event analyzers 140 operating either locally to each device 102, as shown in FIG. 1, or remotely from the devices 102, as shown in FIG. 2, generates event outputs 150 for each device 102 in response to process signals 142 and detected process events that are generated during operation of the device 102.

One embodiment of the system 160 includes an event manager 162 that is configured to generate the relative condition scores 164 for the devices 102 based on the event outputs 150 from the one or more event analyzers 140. The event manager 162 can be an application stored on a tangible recording medium that includes instructions for processing the event outputs 150 and producing the relative condition scores 164 in accordance with the embodiments described below.

In the method, the credential processing devices 102 process credential substrates 124 in accordance with any of the examples described above, as indicated at step 166. During operation of the credential processing devices 102, process signals are generated by the credential processing devices 102 and analyzed by one or more event analyzers 140, which produce event outputs 150 that are indicative of a problem with the corresponding device 102, as discussed above. At step 168, the event manager 162 receives the event outputs 150 from the one or more event analyzers 140. Finally, at step 170, the event manager 162 calculates a relative condition score 164 for a subject device 102, such as device 102S, based on the event outputs 150 corresponding to the subject device 102 and the event outputs corresponding to the other devices 102 in the group. As mentioned above, the relative condition score 164 for the subject device 102S is a measure of a condition of the subject device 102S relative to conditions of the other devices 102 in the group 161.

Embodiments of the processing step 166 include feeding the substrate 124, printing an image to the substrate 124, laminating the substrate 124, encoding data to the substrate 124, inverting the substrate 124 and other credential substrate processes used in the formation of a final credential product.

Embodiments of the event outputs 150 include an indication of a problem during processing of the credential substrate 124 by the corresponding device 102 or a problem with a component 126 of the corresponding device 102. Embodiments of the components 126 to which the event outputs 150 relate include substrate feeding component 128, a printing component 130, a laminating component 132, a substrate inverting component 134, a substrate encoding component 136, and/or other components used in credential processing devices.

In one embodiment of the calculating step 170, the event manager 162 calculates a frequency of the event outputs 150, or error rate, for the devices 102. In one embodiment, the frequency corresponds to the event outputs 150 that correspond to the same or similar problem with the device 102. For example, one frequency is calculated for the event outputs 150 relating to problems with one substrate process (e.g., substrate feeding), while another frequency is calculated for event outputs 150 relating to problems with another substrate process (e.g., substrate printing). Similarly, the frequencies of event outputs 150 can be determined for specific components 126 of the device, such as a printhead, a laminating roller, a motor, or other component of the device 102.

In one embodiment, the event manager 162 compares the frequency of event outputs 150 for the subject device 102S to the frequency of event outputs 150 for the other devices 102 in the group 161. When the frequencies relate to specific components 126 or processes of the devices 102, a direct comparison of the errors of the specific components 126 or processes can be made between the subject device 102S and the other devices 102 in the group 161. Thus, for example, the condition (i.e., performance) of a particular motor within the subject device 102S can be measured directly against the condition of the corresponding motor in the other devices 102 in the group.

In one embodiment, the relative condition 164 score is based on a comparison of the frequency of event outputs 150 for the subject device 102S to a statistical score for the frequencies of event outputs 150 corresponding to the other devices 102 in the group. In one embodiment, the statistical score includes an average of the frequencies of event outputs 150 for all of the devices 102 in the group, or all of the devices 102 except that of the subject device 102S. Other exemplary embodiments of the statistical score include a mean frequency of event outputs 150 and other applicable statistical scores.

The frequency of the event outputs 150 for the subject device 102S can be compared to the frequencies or statistical scores of the other devices 102 in many different ways to generate useful comparison information from which the relative score 164 can be based. Exemplary comparisons include subtracting the frequency of the subject device 102S from the average or mean frequency corresponding to the group of devices 161, taking a ratio of the frequency of event outputs 150 for the subject device 102S to the average or mean frequency of the other devices 102 in the group, and other comparisons.

In accordance with another embodiment, the calculation (step 170) of the relative condition score 164 for the subject device 102S is based on a comparison of a count of the event outputs 150 for the subject device 102S to the count (average, mean, etc.) of event outputs 150 of the other devices 102 in the group. In one embodiment, the event outputs 150 corresponding to each count relates to the same or similar component 126 or process.

In accordance with one embodiment, relative condition scores 164 are generated for each of the other devices 102 in the group 161 in accordance with any of the methods described above.

In accordance with one embodiment, the event manager 162 provides the relative condition scores 164 for the devices 102 such that they are retrievable or observable by an administrator of the system 160. In one embodiment, one or more of the relative condition scores 164 are provided on a display, such as display 118 shown in FIG. 1. In another embodiment, one or more of the relative condition scores 164 are published to a web page. In yet another embodiment, the relative condition scores 164 are stored on a computer-readable and tangible medium, such as memory 106 shown in FIG. 1.

Although the present invention has been described with reference to preferred embodiments, workers skilled in the art will recognize that changes may be made in form and detail without departing from the spirit and scope of the invention.

What is claimed is:

1. A method of monitoring a group of credential processing devices each configured to process credential substrates, the method comprising steps of:

processing credential substrates using the credential processing devices of the group;

receiving event outputs each relating to an occurrence of an event during the processing of the substrate by one of the devices; and calculating a relative condition score for a subject device of the group based on the event outputs corresponding to the subject device and the event outputs corresponding to the other devices in the group, wherein the relative condition score of the subject device is a measure of a condition of the subject device relative to conditions of the other devices in the group.

2. The method of claim 1, wherein the processing step includes a process selected from the group consisting of feeding the substrate, printing an image to the substrate, laminating the substrate, encoding data to the substrate, and inverting the substrate.

3. The method of claim 1, wherein the event outputs corresponding to each device are indicative of a problem during the processing of the credential substrate by the device.

4. The method of claim 1, wherein the event outputs are indicative of a problem with a component of the corresponding device.

5. The method of claim 4, wherein the component is selected from the group consisting of substrate feeding component, a printing component, a laminating component, a substrate inverting component, and a substrate encoding component.

6. The method of claim 1, wherein the calculating step includes calculating a frequency of the event outputs for the subject device.

7. The method of claim 1, wherein the calculating step comprises comparing a frequency of the event outputs for the subject device to frequencies of the event outputs for the other devices in the group.

8. The method of claim 1, wherein the calculating step comprises comparing a count of the event outputs corresponding to the subject device to a count corresponding to the event outputs of the other devices in the group.

9. The method of claim 1, wherein the calculating step comprises comparing the count of event outputs corresponding to the subject device to an average count of event outputs for the devices in the group.

10. A credential production system comprising:

a group of credential processing devices, each device configured to process a credential substrate;

one or more event analyzers configured to produce event outputs each relating to an occurrence of an event during the processing of the substrate by the devices; and a device manager configured to calculate a relative condition score for a subject device of the group based on the event outputs corresponding to the subject device and the event outputs corresponding to the other devices in the group, wherein the relative condition score of the subject device is a measure of a condition of the subject device relative to conditions of the other devices in the group.

11. The system of claim 10, wherein the process is selected from the group consisting of feeding the substrate, printing an image to the substrate, laminating the substrate, encoding data to the substrate, and inverting the substrate.

12. The system of claim 10, wherein the event outputs are each indicative of an error during an operation selected from the group consisting of a substrate feeding operation, a substrate printing operation, a substrate laminating operation, a substrate encoding operation, and a substrate inverting operation.

13. The system of claim 10, wherein the event outputs are each indicative of a parameter relating to the performance of a component of the device.

14. The system of claim 13, wherein the component is selected from the group consisting of substrate feeding component, a printing component, a laminating component, a substrate inverting component, and a substrate encoding component.

15. The system of claim 10, wherein the relative condition score is based on a frequency of the event outputs for the subject device.

16. The system of claim 10, wherein the relative condition score is based on an average frequency of the event outputs of the devices in the group.

17. The system of claim 10, wherein the relative condition score is based on a comparison of a frequency of the event outputs for the subject device to a frequency of event outputs corresponding to the other devices in the group.

18. The system of claim 10, wherein the relative condition score is based on a comparison of a count of the event outputs for the subject device to counts of the event outputs for the other devices in the group.

19. The system of claim 10, wherein the relative condition score is based on a comparison of a count of the event outputs for the subject device to an avenge count of the event outputs for the devices in the group.

* * * * *